United States Patent
Kobilka et al.

(10) Patent No.: US 10,525,671 B2
(45) Date of Patent: Jan. 7, 2020

(54) HYDROPHOBIC METALLIC SURFACE WITH A TUNABLE PORE-SIZE

(71) Applicant: International Business Machines Corporation, Armonk, NY (US)

(72) Inventors: Brandon M. Kobilka, Tucson, AZ (US); Joseph Kuczynski, North Port, FL (US); Jacob T. Porter, Highland, NY (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 15/345,196

(22) Filed: Nov. 7, 2016

(65) Prior Publication Data

US 2018/0126703 A1    May 10, 2018

(51) Int. Cl.
| | |
|---|---|
| *C23C 24/10* | (2006.01) |
| *B32B 15/16* | (2006.01) |
| *B32B 15/01* | (2006.01) |

(52) U.S. Cl.
CPC .............. *B32B 15/16* (2013.01); *B32B 15/01* (2013.01); *C23C 24/106* (2013.01);
(Continued)

(58) Field of Classification Search
CPC .... B22F 2003/244; B22F 7/002; B22F 7/004; B22F 7/006; B32B 2250/22;
(Continued)

(56) References Cited

U.S. PATENT DOCUMENTS

| | | | |
|---|---|---|---|
| 8,221,882 B2 * | 7/2012 | Yamada | B01F 3/0811 |
| | | | 423/338 |
| 8,557,335 B2 | 10/2013 | Makela et al. | |

(Continued)

FOREIGN PATENT DOCUMENTS

| | | |
|---|---|---|
| CN | 101909819 A | 12/2010 |
| CN | 101790596 B | 3/2013 |

(Continued)

OTHER PUBLICATIONS

Guoqiang Li et al., "Large-Area One-Step Assembly of Three-Dimensional Porous Metal Micro/Nanocages by Ethanol-Assisted Femtosecond Laser Irradiation for Enhanced Antireflection and Hydrophobicity," ACS Applied Materials & Interfaces, Dec. 2015, 7, pp. 383-390, plus Supporting Information, pp. S1-S11. (Year: 2015).*

(Continued)

*Primary Examiner* — Vanessa T. Luk

(74) *Attorney, Agent, or Firm* — Matthew J. Bussan

(57) ABSTRACT

A process of providing a coating having a hydrophobic, electrically conductive porous metallic surface on a substrate includes forming a metal-infused plastic lattice that includes a plastic lattice infused with metal particles, and then removing the plastic lattice from the metal-infused plastic lattice. A surface of at least some of the metal particles is textured to increase hydrophobicity by exposing the surface to laser light. In some embodiments, the metal particles are exposed to laser light from a femtosecond pulse laser to produce hydrophobic metal particles before the metal-infused plastic lattice is formed. In other embodiments, the surface of at least some of the metal particles is exposed to laser light from a femtosecond pulse laser after the metal-infused plastic lattice is formed.

4 Claims, 7 Drawing Sheets

(52) U.S. Cl.
CPC ... *B32B 2305/026* (2013.01); *B32B 2307/202* (2013.01); *B32B 2307/7265* (2013.01)

(58) Field of Classification Search
CPC ........ B32B 2255/062; B32B 2266/045; B32B 2305/022; B32B 2305/026
USPC ............................................................ 419/2
See application file for complete search history.

(56) References Cited

U.S. PATENT DOCUMENTS

| | | | |
|---|---|---|---|
| 2010/0028615 | A1 | 2/2010 | Hwang et al. |
| 2014/0183087 | A1 | 7/2014 | Weaver et al. |
| 2015/0004431 | A1* | 1/2015 | Tseng ...................... C22C 45/10 428/613 |
| 2015/0072164 | A1 | 3/2015 | Petralia et al. |
| 2017/0320050 | A1 | 11/2017 | King et al. |
| 2018/0025813 | A1 | 1/2018 | Kobilka et al. |

FOREIGN PATENT DOCUMENTS

| | | |
|---|---|---|
| CN | 103469215 B | 10/2015 |
| CN | 104818453 B | 6/2016 |
| JP | 2004296424 A | 10/2004 |

OTHER PUBLICATIONS

Dong et al., "Investigation on the antibacterial micro-porous titanium with silver nano-particles," Journal of Nanoscience and Nanotechnology, vol. 13, No. 10, 2013, pp. 6782-6786, Abstract only (2 pages), printed from <https://www.ncbi.nlm.nih.gov/pubmed/24245143> on Aug. 17, 2016.

Akay et al., "Preparation of Nanostructured Microporous Metal Foams through Flow Induced Electroless Deposition," Journal of Nanomaterials, vol. 2015, Article ID 275705, 2015, pp. 1-17, downloaded from <http://downloads.hindawi.com/journals/jnm/2015/275705.pdf> on Nov. 4, 2016.

Rinnerbauer et al., "Nanoimprinted superlattice metallic photonic crystal as ultra-selective solar absorber," 4 pages, downloaded from <http://www.mit.edu/~soljacic/superlattice_Optica.pdf> on Aug. 17, 2016.

Kacsandi, Nick, "Manufacturing a Porous, Hydrophobic Metallic Surface," NineSights, NineSigma, Request No. REQ1301074, 3 pages, printed from <https://ninesights.ninesigma.com/rfps/-/rfp-portlet/rfpViewer/3010> on Aug. 17, 2016.

Velev et al., "A class of porous metallic nanostructures," Nature, vol. 401, 1999, p. 548.

Velev et al., "A class of porous metallic nanostructures," Nature, vol. 401, 1999, p. 548, Supplementary Information (6 pages), printed from <http://crystal.che.ncsu.edu/Suppl_gold.html> on Aug. 18, 2016.

Hang et al., "Super-hydrophobic nickel films with micro-nano hierarchical structure prepared by electrodeposition," Applied Surface Science, vol. 256, Issue 8, 2010, pp. 2400-2404, Abstract only (2 pages), printed from <http://www.sciencedirect.com/science/article/pii/S0169433209015190> on Oct. 20, 2016.

Unknown, "Surface Tension—(Wikipedia)," 7 pages, printed from <http://www.tau.ac.il/~phchlab/experiments_new/surface_tenstion/theory.html> on Oct. 20, 2016.

Vorobyev et al., "Multifunctional surfaces produced by femtosecond laser pulses," Journal of Applied Physics, vol. 117, 033103, 2015, pp. 033103-1 thru 033103-5.

* cited by examiner

HYDROPHOBIC METALLIC SURFACE WITH A TUNABLE PORE-SIZE

BACKGROUND

The present invention relates in general to the field of materials science. More particularly, the present invention relates to providing a coating on a substrate, the coating having a hydrophobic, electrically conductive porous metallic surface.

Micro-porous and nano-porous metallic surfaces and membranes have a wide variety of uses ranging from antibacterial surfaces to catalytic microreactors to photonic absorbers. These applications span a broad range of industries and consumer goods. Variations in the nanoscale characteristics of a functional surface may have a significant impact on performance characteristics, such as conductivity, in some applications. To illustrate, minor alterations in contact angle, porosity, and patterning may result in significant impacts on particular performance characteristics.

SUMMARY

In accordance with an embodiment, a process of providing a coating having a hydrophobic, electrically conductive porous metallic surface on a substrate is disclosed. The process includes forming a metal-infused plastic lattice that includes a plastic lattice infused with metal particles, and then removing the plastic lattice from the metal-infused plastic lattice. A surface of at least some of the metal particles is textured to increase hydrophobicity by exposing the surface to laser light. The metal particles may be exposed to laser light from a femtosecond pulse laser to produce hydrophobic metal particles before the metal-infused plastic lattice is formed. Alternatively, the surface of at least some of the metal particles may be exposed to laser light from a femtosecond pulse laser after the metal-infused plastic lattice is formed.

In accordance with another embodiment, an article of manufacture is disclosed. The article of manufacture includes a coating on a substrate, the coating having a hydrophobic, electrically conductive porous metallic surface.

BRIEF DESCRIPTION OF THE SEVERAL VIEWS OF THE DRAWINGS

Embodiments of the present invention will hereinafter be described in conjunction with the appended drawings, where like designations denote like elements.

DETAILED DESCRIPTION

Figure 1:
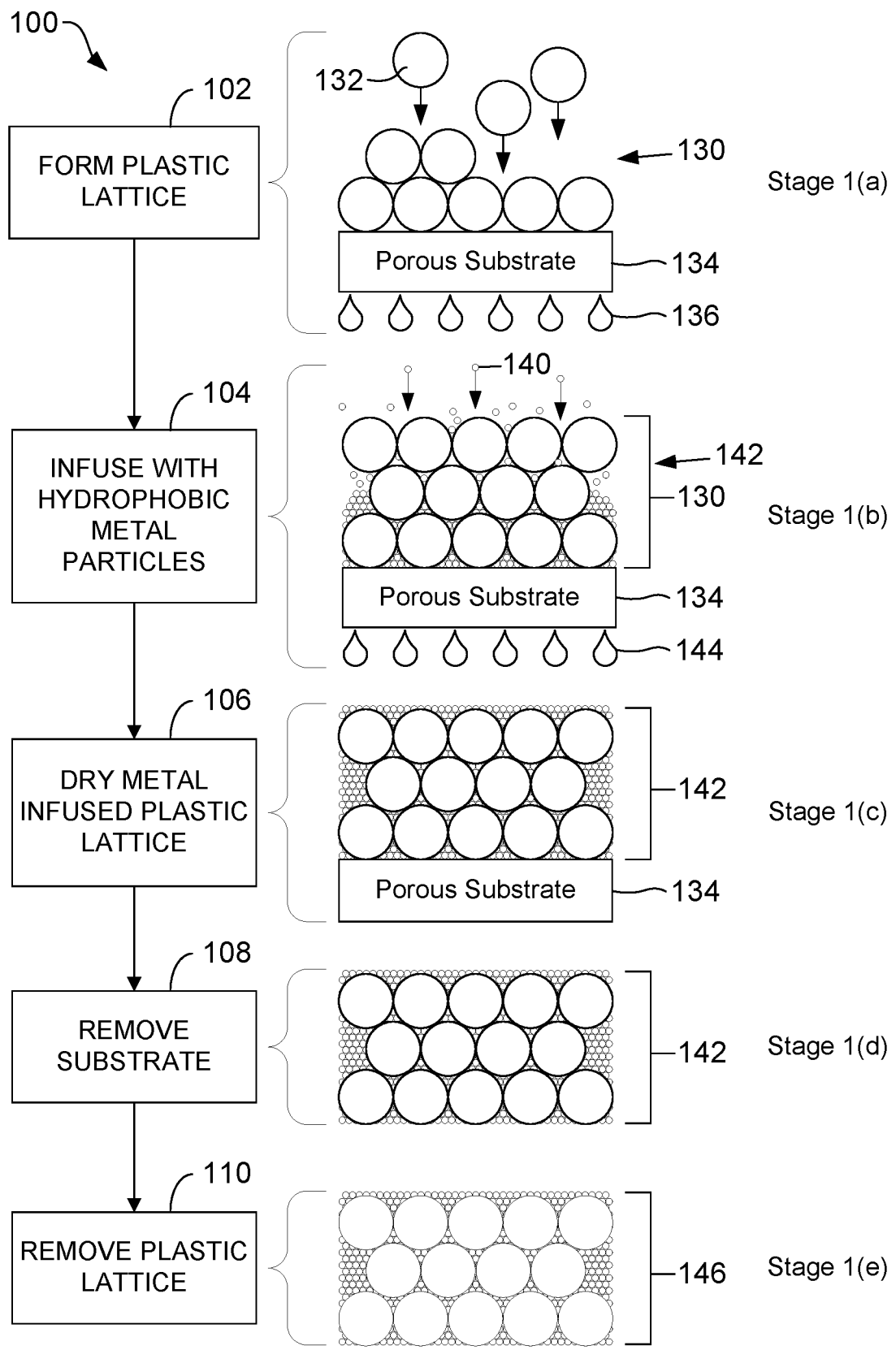
FIG. 1 is a flow diagram illustrating, through stages 1(*a*)-1(*e*), a process of producing a hydrophobic, electrically conductive porous metallic material, according to one embodiment.

The present disclosure describes hydrophobic, electrically conductive porous metallic materials that may be utilized as a coating material that may act as a hydrophobic mesh on a metallic substrate, among other possible applications. In an example application, the hydrophobic, electrically conductive porous metallic materials of the present disclosure may be utilized in a process of manufacturing a hydrophobic, electrically conductive porous metallic surface that satisfies particular performance characteristics. For example, the hydrophobic, electrically conductive metallic materials of the present disclosure may be used to generate a microporous and hydrophobic metallic surface that can withstand alkaline environments.

As an illustrative, non-limiting example, a metallic substrate (e.g., nickel) that is coated with the hydrophobic, electrically conductive porous metallic material(s) of the present disclosure may have a surface that exhibits a "mesh" of apertures no larger than 5-10 micrometers in size (average diameter), a contact angle greater than 120° (e.g., 150°), and may be permeable to gases and/or non-aqueous liquids but not aqueous liquids. While electrodeposition techniques have been utilized to form electrically conductive, microporous metallic surfaces that also exhibit hydrophobicity, there may be challenges associated with imparting such characteristics via such deposition techniques.

The techniques described herein represent an alternative approach that does not use electrodeposition. In particular, utilizing the hydrophobic, electrically conductive porous material(s) of the present disclosure to coat a metallic substrate may overcome challenges associated with attempts to impart such characteristics via electrodeposition techniques. Typically, electrically conductive coatings display varying degrees of hydrophilicity. The present disclosure describes processes to generate a hydrophobic metallic surface with tunable pore sizes ranging from the nanoscale to the microscale that does not use electrodeposition techniques. For example, the pore size may be tunable so that the hydrophobic, electrically conductive porous metallic material(s) of the present disclosure exhibits a "mesh" of apertures no larger than 5-10 micrometers in size (average diameter).

As described further herein, in a particular embodiment, porous metallic surfaces may be generated using techniques that utilize plastic nano or microbeads to create a lattice. The lattice is then infused with the desired metal, and the plastic lattice is removed via high temperature degradation, dissolved, or oxidized by washing with common solvents. In accordance with some embodiments of the present invention, the lattice is infused with metal particles textured to increase hydrophobicity. For example, a surface of at least some of the metal particles may be textured by exposing the surface to laser light from a femtosecond pulse laser. This femtosecond laser technique for treating the surface of the metal particles may be performed either before or after the metal particles are infused in the plastic lattice.

Referring to FIG. 1, a flow diagram illustrates, through stages 1(a)-1(e), an exemplary process 100 of producing a hydrophobic, electrically conductive porous metallic material, according to one embodiment. In the embodiment shown in FIG. 1, at least a subset of the metal particles infused into the plastic lattice are treated to increase hydrophobicity of the metal particles, using a system for implementing a femtosecond laser technique as illustrated and described further herein with reference to FIGS. 4 and 5, before the metal particles are infused in a plastic lattice. As illustrated and described further herein with respect to FIG. 3, the hydrophobic, electrically conductive porous metallic material formed according to the process depicted in FIG. 1 may be used as a coating material on a metallic substrate.

In the process 100, the steps discussed below (steps 102-110) are performed. These steps are set forth in their preferred order. It must be understood, however, that the various steps may occur simultaneously or at other times relative to one another. Moreover, those skilled in the art will appreciate that one or more steps may be omitted.

In each of the stages 1(a)-1(e), the structure is shown in a cross-sectional side view.

Stage 1(a). The process 100 begins by forming a plastic lattice 130 by depositing plastic particles 132 onto a porous substrate 134 by filtering a suspension containing the plastic particles 132 (step 102). Filtrate from this suspension that has passed through the porous substrate 134 is represented in FIG. 1 as filtrate droplets 136. The plastic particles 132 used to form the plastic lattice 130 may be, for example, latex. As an illustrative, non-limiting example, the plastic particles 132 may be polystyrene latex microspheres.

Other particles with relatively low decomposition temperatures, or those with good solubility in common solvents, may be used in lieu of, or in addition to, latex. Other polymeric materials with similar or lower decomposition temperature profiles include: polyethylene, poly(vinyl alcohol), polybutadiene, ABS copolymer, polyisoprene, polypropylene, poly(methyl methacrylate), polyacetals, and poly(vinyl chloride), among other alternatives.

The plastic particles 132 may range in size from nano-scale to micro-scale. The size of the plastic particles 132 may be chosen to control (or "tune") the size of the voids (or final pore size) in the hydrophobic, electrically conductive porous metallic material formed according to the process depicted in FIG. 1. Typically, the plastic particles 132 range in diameter from 300 nm to 1 μm. More generally, however, the plastic particles 132 may range in diameter from 100 nm to 5 μm.

In one example, the size of the plastic particles 132 may be selected to be within the range from 100 nm to 500 nm, to produce relatively small pores in the hydrophobic, electrically conductive porous metallic material formed according to the process depicted in FIG. 1. In another example, the size of the plastic particles 132 may be selected to be within the range from >500 nm to 5 μm, to produce relatively large pores in the hydrophobic, electrically conductive porous metallic material formed according to the process depicted in FIG. 1.

The plastic particles 132 are diluted into a diluent, such as deionized water, to form a suspension. The diluent is also referred to herein as a solvent. Other diluents may be used in lieu of, or in addition to, deionized water. One or more surfactants may be added to the suspension. For example, nonionic surfactants, such as TWEEN 20 and Triton X-100, may be used. Alternatively, anionic surfactants, especially alkyl sulfonates such as sodium dodecyl sulfate, may be used.

The porous substrate 134 may be any desired porous material. The substrate 134 must be porous to permit filtering. The porous substrate 134 may be metallic or non-metallic. As an illustrative, non-limiting example, the porous substrate 134 may be a smooth polycarbonate (PC) membrane with pores. As another illustrative, non-limiting example, the porous substrate 134 may be a metallic porous substrate (e.g., nickel). The pores of the porous substrate 134 are sized to retain the plastic particles 132 and metal particles 140 (discussed in detail below), but allow for a suitably high flux of the diluent. The dilute plastic particles 132 slowly accumulate by filtration on the porous substrate 134 into densely packed layers.

Stage 1(b). The process 100 continues by forming a metal-infused plastic lattice 142 that includes a plastic lattice 130 infused with hydrophobic metal particles 140 (step 104). The metal-infused plastic lattice 142 is also referred to herein as a composite. The hydrophobic metal particles 140 have a laser-induced hydrophobic characteristic. In the embodiment shown in FIG. 1, at least a subset of the metal particles infused into the plastic lattice 130 are treated to increase hydrophobicity of the metal particles, using a system for implementing a femtosecond laser technique as illustrated and described further herein with reference to FIGS. 4 and 5, before the metal particles are infused into the plastic lattice 130. The femtosecond laser technique uses a pulsed laser that creates hierarchical nanostructures on at least a subset of the metal particles that will be infused into the plastic lattice 130 in step 104. One skilled in the art will appreciate, however, that the hydrophobic metal particles 140 infused into the plastic lattice 130 in step 104 may be produced by other systems and/or other techniques.

The metal particles infused into the plastic lattice 130, including the hydrophobic metal particles 140, may be any desired metal. As an illustrative, non-limiting example, the metal particles (including the hydrophobic metal particles 140) infused into the plastic lattice 130 may include metal particles having a surface composed of: gold, platinum, nickel, copper, palladium, and alloys. Non-hydrophobic versions of these metal particles, which may be solid metal or metal clad, are commercially available.

In step 104, metal particles (including the hydrophobic metal particles 140) are infused into the plastic lattice 130 by filtering an aqueous colloidal solution containing the metal particles through the plastic lattice 130 until the plastic lattice 130 is saturated with the metal particles.

The hydrophobic metal particles 140 may range in size from nano-scale to micro-scale. The size of the hydrophobic metal particles 140 is generally chosen to be significantly smaller than the openings between the plastic particles 132 in the plastic lattice 130. The hydrophobic metal particles 140, dispersed in an aqueous colloidal solution, for example, are slowly deposited in the interstices of the plastic particles 132 of the plastic lattice 130 by filtration. More generally, the hydrophobic metal nanoparticles 140 are dispersed in a colloidal suspension. A colloidal suspension of the metal particles (including the hydrophobic metal particles 140) may be prepared by techniques known to those skilled in the art. Filtrate from this colloidal suspension that has passed through the porous substrate 134 is represented in FIG. 1 as filtrate droplets 144. Typically, the hydrophobic metal particles 140 range in diameter from 15 nm to 25 μm. More generally, however, the hydrophobic metal particles 140 may range in diameter from 2 nm to 1 µm or more.

Stage 1(c). The process 100 continues by drying the metal-infused plastic lattice 142 (step 106). In order to limit cracking of the film, it is crucial to remove all of the solvent from the filtration steps prior to calcination and thermal degradation of the plastic lattice 130 (step 110, described below). The solvent from the filtration steps may include diluent from the suspension in step 102 and/or water from the aqueous colloidal solution in step 104. Drying the metal-infused plastic lattice 142 may be accomplished by raising the metal-infused plastic lattice 142 to a temperature sufficient to evaporate the solvent without excessive or violent boiling. This temperature is solvent dependent. For example, if the solvent is water, the metal-infused plastic lattice 142 may be air-dried at 50° C. for 1 to 2 hours.

Stage 1(d). The process 100 continues by removing the metal-infused plastic lattice 142 from the porous substrate 134 (step 108). Step 108 is only necessary if the porous substrate 134 is a temporary substrate. In the process 100, the metal-infused plastic lattice 142 is formed on a temporary substrate (i.e., the porous substrate 134) and at least partially dried, removed from the temporary substrate, and then further processed to form a hydrophobic, electrically conductive porous metallic material 146 (stage 1(e), described below), which is subsequently applied to a permanent substrate. Step 108 may be omitted if the porous substrate 134 is a permanent substrate. Moreover, the order of steps 106 and 108 may be reversed.

Stage 1(e). The process 100 continues by removing the plastic lattice 130 from the composite 142 to form a hydrophobic, electrically conductive porous metallic material 146 (step 110). The plastic lattice 130 may be removed from the composite via a thermal degradation processes (this may include calcination) at elevated temperature. Calcination produces a hydrophobic, electrically conductive porous metallic material that is typically macro-porous. Alternative procedures for removal of the plastic lattice include, but are not limited to, dissolution in common solvents (e.g., chloroform or THF) and oxidation with aqueous acid (e.g., a mixture of concentrated sulfuric acid and inorganic oxidizer). Dissolution and oxidation produce a hydrophobic, electrically conductive porous metallic material that is typically meso/macro-porous.

PROPHETIC EXAMPLE 1

In this example, the plastic particles are monodisperse, negatively charged polystyrene latex microspheres that range in diameter from 300 nm to 1 µm. Also, in this example, the porous substrate is a polycarbonate (PC) membrane having a nominal pore size of 50 nm.

Form latex lattice. A latex suspension is prepared by diluting the latex particles (0.25 g) into 10 mL of deionized water. Added to the latex suspension is 0.15 wt % of a nonionic surfactant, TWEEN 20. A latex lattice is formed by filtering the latex suspension through the PC membrane at 20 kPa for 2 hours. The latex particles slowly accumulate on the surface of the PC membrane into densely packed layers having a thickness of about 35 µm.

Prepare hydrophobic gold nanoparticles. The hydrophobic metal particles in this example are gold nanoparticles with laser-induced hydrophobic characteristics. The gold nanoparticles, which range in diameter from 15 nm to 25 nm, are treated to increase their hydrophobicity using a system for implementing a femtosecond laser technique as illustrated and described further herein with reference to FIGS. 4 and 5. For example, the gold nanoparticles may be treated to increase their hydrophobicity by exposing the gold nanoparticles to laser light having about 65 femtosecond (fs) pulses of light at a wavelength of about 800 nanometers (nm), a rate of approximately 1 (kHz), and an energy of about 4 to 10 joules per square centimeter (J/cm$^2$).

Infuse latex lattice with hydrophobic gold nanoparticles. A gold suspension is prepared by diluting the hydrophobic gold nanoparticles (0.50 g) in 10 mL of deionized water. Added to the gold suspension may include a surfactant such as Triton X-100. Alternatively, a gold suspension may be obtained commercially and the gold nanoparticles therein may be treated (while in the gold suspension) to increase their hydrophobicity using a system for implementing a femtosecond laser technique as illustrated and described further herein with reference to FIG. 4 by flowing the gold suspension across the laser beams. A gold-infused latex lattice is formed by infusing the gold nanoparticles into the latex lattice by filtering the gold suspension through the latex lattice/PC membrane at 95 kPa for 1 to 3 days. The hydrophobic gold nanoparticles are retained even though the hydrophobic gold nanoparticles are smaller than the nominal pore size of the porous substrate.

Dry gold-infused latex lattice. The gold-infused latex lattice/PC membrane is air-dried at 50° C. for 1 to 2 hours.

Remove PC membrane. The gold-infused latex lattice is separated from the PC membrane.

Remove latex lattice. A hydrophobic, electrically conductive porous metallic material is formed by removing the latex lattice from the composite. This may be achieved by a thermal degradation process (this may include calcination) at elevated temperature. In the thermal degradation process, the temperature of the gold-infused latex lattice is ramped up at 0.2° C./min from RT to 300° C., maintained at 300° C. for 30 minutes, and then cooled back to RT. Alternative procedures for removal of the latex particles include, but are not limited to, dissolution in common solvents (e.g., wash with chloroform for 2 to 3 hours, and then air-dry) and oxidation with aqueous acid (e.g., soak in a mixture of concentrated sulfuric acid and inorganic oxidizer for 24 hours, wash with deionized water, and then air-dry).

Figure 2:
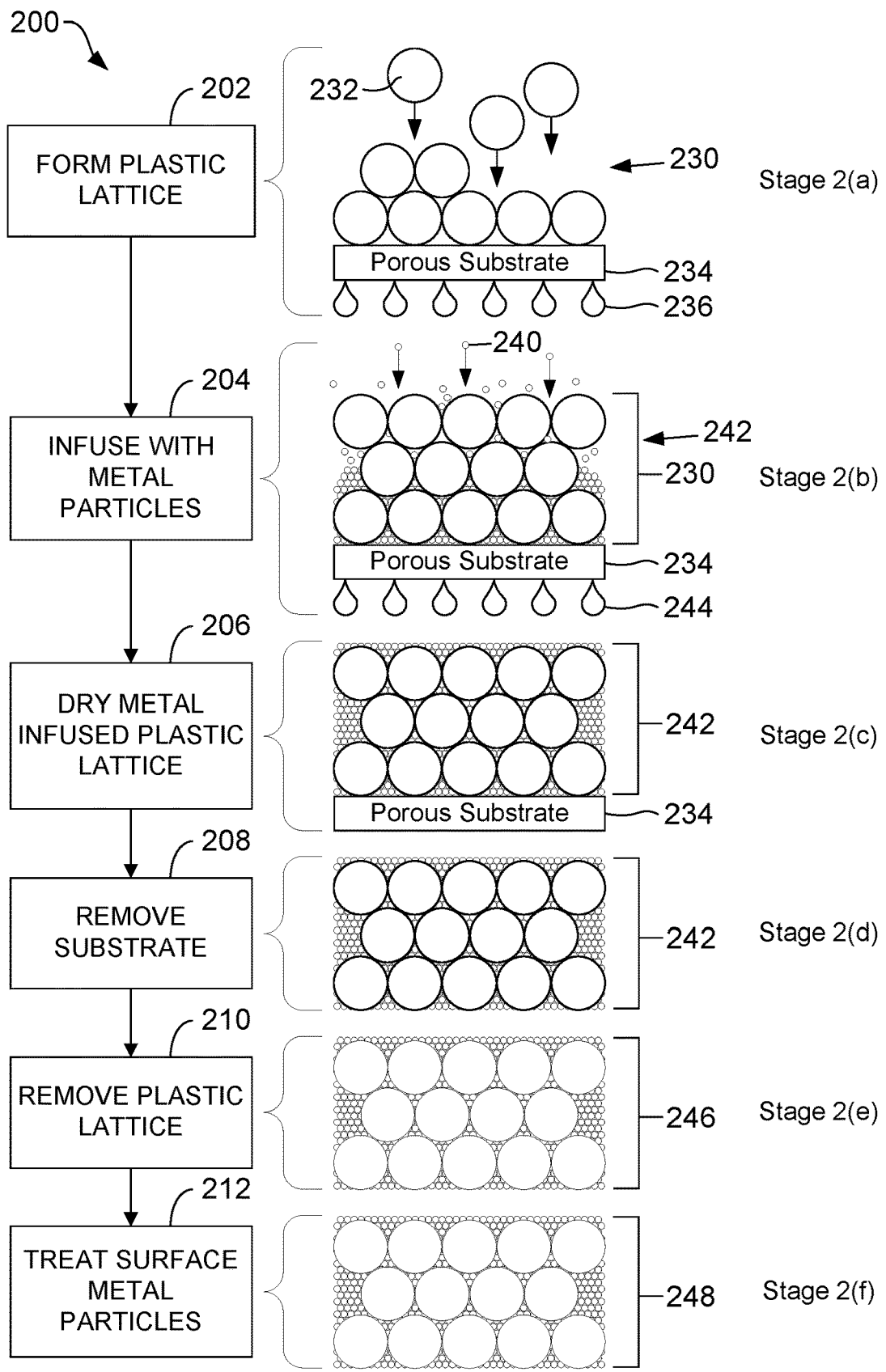
FIG. 2 is a flow diagram illustrating, through stages 2(*a*)-2(*f*), a process of producing a hydrophobic, electrically conductive porous metallic material, according to one embodiment.

Referring to FIG. 2, a flow diagram illustrates, through stages 2(a)-2(f), an exemplary process 200 of producing a hydrophobic, electrically conductive porous metallic material, according to one embodiment. In the embodiment shown in FIG. 2, at least a subset of the metal particles along a surface of an electrically conductive porous metallic material are treated to increase hydrophobicity of those metal particles, using a system for implementing a femtosecond laser technique as illustrated and described further herein with reference FIG. 6, after the metal particles are infused in a plastic lattice. As illustrated and described further herein with respect to FIG. 3, the hydrophobic, electrically conductive porous metallic material formed according to the process depicted in FIG. 2 may be used as a coating material on a metallic substrate.

In the process 200, the steps discussed below (steps 202-212) are performed. These steps are set forth in their preferred order. In must be understood, however, that the various steps may occur simultaneously or at other times relative to one another. Moreover, those skilled in the art will appreciate that one or more steps may be omitted.

In each of the stages 2(a)-2(f), the structure is shown in a cross-sectional side view.

Stage 2(a). The process 200 begins by forming a plastic lattice 230 by depositing plastic particles 232 onto a porous substrate 234 by filtering a suspension containing the plastic particles 232 (step 202). Filtrate from this suspension that has passed through the porous substrate 234 is represented in FIG. 2 as filtrate droplets 236. The plastic particles 232 used to form the plastic lattice 230 may be, for example, latex. As an illustrative, non-limiting example, the plastic particles 232 may be polystyrene latex microspheres.

Other particles with relatively low decomposition temperatures, or those with good solubility in common solvent, may be used in lieu of, or in addition to, latex. Other polymeric materials with similar or lower decomposition temperature profiles include: polyethylene, poly(vinyl alcohol), polybutadiene, ABS copolymer, polyisoprene, polypropylene, poly(methyl methacrylate), polyacetals, and poly(vinyl chloride), among other alternatives.

The plastic particles 232 may range in size from nano-scale to micro-scale. The size of the plastic particles 232 may be chosen to control (or "tune") the size of the voids (or final pore size) in the hydrophobic, electrically conductive porous metallic material formed according to the process depicted in FIG. 2. Typically, the plastic particles 232 range in diameter from 300 nm to 1 µm. More generally, however, the plastic particles 232 may range in diameter from 100 nm to 5 µm.

In one example, the size of the plastic particles 232 may be selected to be within the range from 100 nm to 500 nm, to produce relatively small pores in the hydrophobic, electrically conductive porous metallic material formed according to the process depicted in FIG. 2. In another example, the size of the plastic particles 232 may be selected to be within the range from >500 nm to 5 µm, to produce relatively large pores in the hydrophobic, electrically conductive porous metallic material formed according to the process depicted in FIG. 2.

The plastic particles 232 are diluted into a diluent, such as deionized water, to form a suspension. The diluent is also referred to herein as a solvent. Other diluents may be used in lieu of, or in addition to, deionized water. One or more surfactants may be added to the suspension. For example, nonionic surfactants such as TWEEN 20 and Triton X-100, may be used. Alternatively, anionic surfactant, especially alkyl sulfonates such as sodium dodecyl sulfate, may be used.

The porous substrate 234 may be any desired porous material. The substrate 234 must be porous to permit filtering. The porous substrate 234 may be metallic or non-metallic. As an illustrative, non-limiting example, the porous substrate 234 may be a smooth polycarbonate (PC) membrane with pores. As another illustrative, non-limiting example, the porous substrate 234 may be a metallic porous substrate (e.g., nickel). The pores of the porous substrate 234 are sized to retain the plastic particles 232 and metal particles 240 (discussed in detail below), but allow for a suitably high flux of the diluent. The dilute plastic particles 232 slowly accumulate by filtration on the porous substrate 234 into densely packed layers.

Stage 2(b). The process 200 continues by forming a metal-infused plastic lattice 242 that includes a plastic lattice 230 infused with metal particles 240 (step 204). The metal-infused plastic lattice 242 is also referred to herein as a composite. The metal particles 240 may be any desired metal. As an illustrative, non-limiting example, the metal particles 240 may include metal particles having a surface composed of: gold, platinum, nickel, copper, palladium, and alloys. These metal particles, which may be solid metal or metal clad, are commercially available.

In step 204, the metal particles 240 are infused into the plastic lattice 230 by filtering an aqueous colloidal solution containing the metal particles 240 through the plastic lattice 230 until the plastic lattice 230 is saturated with the metal particles 240.

The metal particles 240 may range in size from nano-scale to micro-scale. The size of the metal particles 240 is generally chosen to be significantly smaller than the openings between the plastic particles 232 in the plastic lattice 230. The metal particles 240, dispersed in an aqueous colloidal solution, for example, are slowly deposited in the interstices of the plastic particles 232 of the plastic lattice 230 by filtration. More generally, the metal nanoparticles 240 are dispersed in a colloidal suspension. A colloidal suspension of the metal particles 240 may be prepared by techniques known to those skilled in the art. Filtrate from this colloidal suspension that has passed through the porous substrate 234 is represented in FIG. 2 as filtrate droplets 244. Typically, the metal particles 240 range in diameter from 15 nm to 25 µm. More generally, however, the metal particles 240 may range in diameter from 2 nm to 1 µm or more.

Stage 2(c). The process 200 continues by drying the metal-infused plastic lattice 242 (step 206). In order to limit cracking of the film, it is crucial to remove all of the solvent from the filtration steps prior to calcination and thermal degradation of the plastic lattice 230 (step 210, described below). The solvent from the filtration steps may include diluent from the suspension in step 202 and/or water from the aqueous colloidal solution in step 204. Drying the metal-infused plastic lattice 242 may be accomplished by raising the metal-infused plastic lattice 242 to a temperature sufficient to evaporate the solvent without excessive or violent boiling. This temperature is solvent dependent. For example, if the solvent is water, the metal-infused plastic lattice 242 may be air-dried at 50° C. for 1 to 2 hours.

Stage 2(d). The process 200 continues by removing the metal-infused plastic lattice 242 from the porous substrate 234 (step 208). Step 208 is only necessary if the porous substrate 234 is a temporary substrate. In the process 200, the metal-infused plastic lattice 242 is formed on a temporary substrate (i.e., the porous substrate 234) and at least partially dried, removed from the temporary substrate, and then further processed to form a hydrophobic, electrically conductive porous metallic material 248 (stage 2(f), described below), which is subsequently applied to a permanent substrate. Step 208 may be omitted if the porous substrate 234 is a permanent substrate. Moreover, the order of steps 206 and 208 may be reversed.

Stage 2(e). The process 200 continues by removing the plastic lattice 230 from the composite 242 to form an electrically conductive porous metallic material 246 (step 210). The plastic lattice 230 may be removed from the composite via a thermal degradation processes (this may include calcination) at elevated temperature. Calcination produces an electrically conductive porous metallic material that is typically macro-porous. Alternative procedures for removal of the plastic lattice include, but are not limited to, dissolution in common solvents (e.g., chloroform or THF) and oxidation with aqueous acid (e.g., a mixture of concentrated sulfuric acid and inorganic oxidizer). Dissolution and oxidation produce an electrically conductive porous metallic material that is typically meso/macro-porous.

Stage 2(f). The process 200 continues by exposing at least a subset of the metal particles 232 along a surface of the electrically conductive porous metallic material 246 to the laser light to increase hydrophobicity of those metal particles 232 (step 212). This may be accomplished using a system for implementing a femtosecond laser technique as illustrated and described further herein with reference FIG.

6. Treating a surface of the electrically conductive porous metallic material 246 using a femtosecond laser technique forms a hydrophobic, electrically conductive porous metallic material 248. The metal particles 232 exposed to the laser light have a laser-induced hydrophobic characteristic. The femtosecond laser technique uses a pulsed laser that creates hierarchical nanostructures on at least a subset of the metal particles 232 along a surface of the electrically conductive porous metallic material 246. Those skilled in the art will appreciate, however, that other systems and/or other techniques may be employed to increase hydrophobicity of the metal particles 232 along a surface of the electrically conductive porous metallic material 246.

Preferably, exposure to the laser light occurs in step 212, i.e., after the plastic lattice 230 has been removed from the composite 242 in step 210. This permits the laser light to penetrate deeper into the material, i.e., the laser light penetrates into the voids created by the removal of the plastic lattice 230. However, those skilled in the art will appreciate that exposure to the laser light may occur at any point after infusion of the metal particles 240 into the plastic lattice 230.

PROPHETIC EXAMPLE 2

In this example, the plastic particles are monodisperse, negatively charged polystyrene latex microspheres that range in diameter from 300 nm to 1 μm. Also, in this example, the porous substrate is a polycarbonate (PC) membrane having a nominal pore size of 50 nm. Also, in this example, the metal particles are gold nanoparticles that range in diameter from 15 nm to 25 nm.

Form latex lattice. A latex suspension is prepared by diluting the latex particles (0.25 g) into 10 mL of deionized water. Added to the latex suspension is 0.15 wt % of a nonionic surfactant, such as Triton X-100 or TWEEN 20. A latex lattice is formed by filtering the latex suspension through the PC membrane at 20 kPa for 2 hours. The latex particles slowly accumulate on the surface of the PC membrane into densely packed layers having a thickness of about 35 μm.

Infuse latex lattice with gold nanoparticles. A gold suspension is prepared by diluting the gold nanoparticles (0.50 g) in 10 mL of deionized water. Added to the gold suspension may include a surfactant such as Triton X-100. A gold-infused latex lattice is formed by infusing the gold nanoparticles into the latex lattice by filtering the gold suspension through the latex lattice/PC membrane at 95 kPa for 1 to 3 days. The gold nanoparticles are retained even though the gold particles are smaller than the nominal pore size of the porous substrate.

Dry gold-infused latex lattice. The gold-infused latex lattice/PC membrane is air-dried at 50° C. for 1 to 2 hours.

Remove PC membrane. The gold-infused latex lattice is separated from the PC membrane.

Remove latex lattice. An electrically conductive porous gold material is formed by removing the latex particles from the gold-infused latex lattice. This may be achieved by a thermal degradation process (this may include calcination) at elevated temperature. In the thermal degradation process, the temperature of the gold-infused latex lattice is ramped up at 0.2° C./min from RT to 300° C., maintained at 300° C. for 30 minutes, and then cooled back to RT. Alternative procedures for removal of the latex particles include, but are not limited to, dissolution in common solvents (e.g., wash with trichloromethane for 2 to 3 hours, and then air-dry) and oxidation with aqueous acid (e.g., soak in a mixture of concentrated sulfuric acid and inorganic oxidizer for 24 hours, wash with deionized water, and then air-dry).

Treat surface gold nanoparticles. At least, a subset of the gold nanoparticles along a surface of the electrically conductive porous gold material are treated to increase hydrophobicity of those gold nanoparticles, using a system for implementing a femtosecond laser technique as illustrated and described further herein with reference FIG. 6. For example, the gold nanoparticles along a surface of the electrically conductive porous gold material may be treated to increase their hydrophobicity by exposing that surface of the electrically conductive porous gold material to laser light having about 65 femtosecond (fs) pulses of light at a wavelength of about 800 nanometers (nm), a rate of approximately 1 (kHz), and an energy of about 4 to 10 joules per square centimeter ($J/cm^2$).

As illustrated in FIGS. 1 and 2, the metal-infused plastic lattice 142, 242 is formed on a temporary substrate (i.e., the porous substrate 134, 234) and then removed from the temporary substrate. Hence, the hydrophobic, electrically conductive porous metallic material produced via the process 100, 200 may be subsequently applied (e.g., adhered using adhesive) to the desired surface or article as a coating material. Alternatively, the porous surface-forming steps of FIGS. 1 and 2 (i.e., steps 102 and 104; and steps 202 and 204) may be applied directly to the desired surface or article as a coating material.

Figure 3:
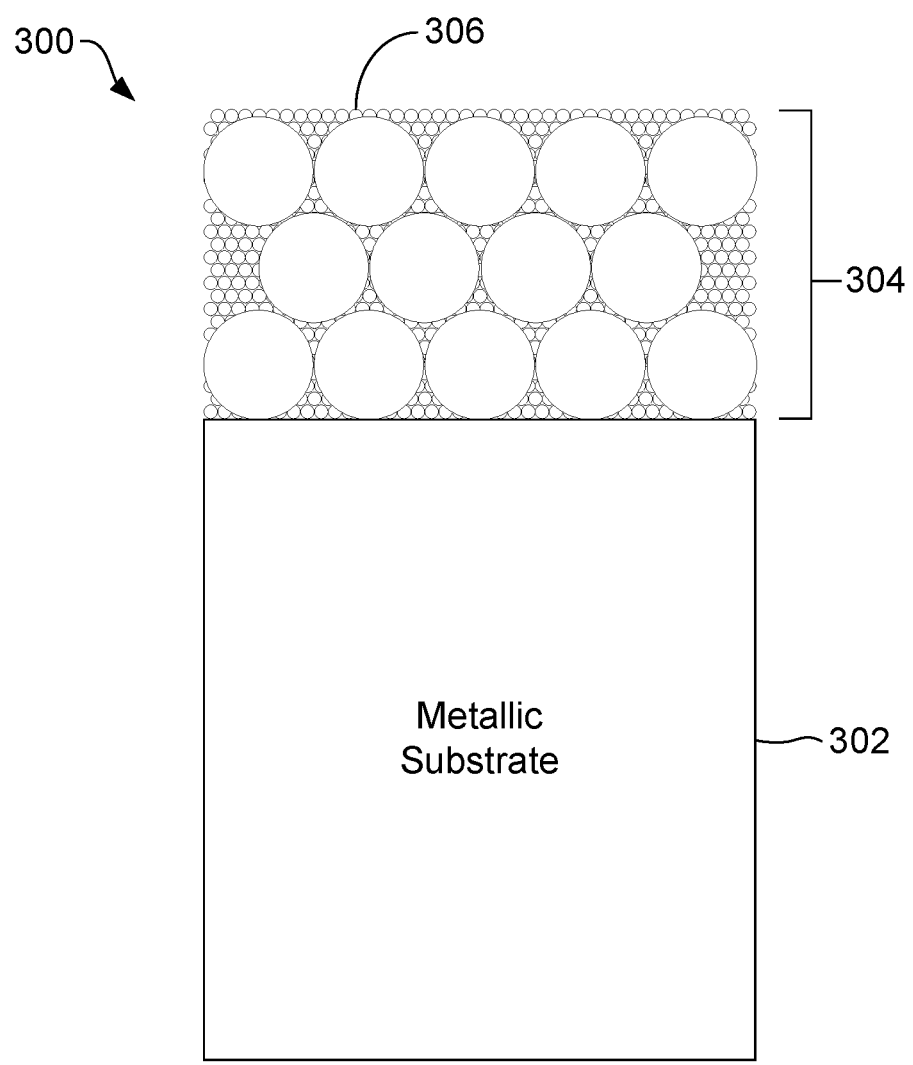
FIG. 3 is a sectional view diagram illustrating a portion of an article of manufacture that includes a metallic substrate that is coated with the hydrophobic, electrically conductive porous metallic material to form a hydrophobic, electrically conductive barrier on the metallic substrate, according to one embodiment.

Thus, FIGS. 1 and 2 illustrate examples of processes of forming a hydrophobic, electrically conductive porous metallic material that may be used as a coating material on a substrate (as illustrated and further described herein with respect to FIG. 3). As described further herein, a substrate (e.g., a metallic substrate such as nickel) that is coated with the hydrophobic, electrically conductive porous metallic material depicted in FIGS. 1 and 2 may have a surface that exhibits a "mesh" of apertures no larger than 5-10 micrometers in size (average diameter), a contact angle greater than 120° (e.g., 150°), and may be permeable to gases and/or non-aqueous solutions but not aqueous solutions.

In accordance with some embodiments, after synthesis of the hydrophobic, electrically conductive porous material depicted in FIG. 1 (or FIG. 2), the hydrophobic, electrically conductive porous material depicted in FIG. 1 (or FIG. 2) may be applied to a porous or nonporous substrate using techniques well known to those skilled in the art. The substrate may be metallic or non-metallic. For example, a suitable conventional adhesive may be used to adhere the hydrophobic, electrically conductive porous material depicted in FIG. 1 (or FIG. 2) to a non-porous nickel substrate.

In accordance with other embodiments, the hydrophobic, electrically conductive porous material depicted in FIG. 1 (or FIG. 2) is formed directly on a porous substrate. The substrate must be porous in such embodiments to permit the metal-infused plastic lattice to be formed by filtering. The porous substrate may be metallic or non-metallic. For example, the hydrophobic, electrically conductive porous material depicted in FIG. 1 (or FIG. 2) may be formed on a porous nickel substrate.

Referring to FIG. 3, a sectional view diagram depicts a portion of an article of manufacture 300 that includes a metallic substrate 302 that is coated with the hydrophobic, electrically conductive porous metallic material 304 to form a hydrophobic, electrically conductive barrier on the metallic substrate 302, according to one embodiment. The hydrophobic, electrically conductive porous metallic material 304 of FIG. 3 may correspond to the hydrophobic, electrically conductive porous metallic material 146 of FIG. 1 or the hydrophobic, electrically conductive porous metallic material 248 of FIG. 2. In some embodiments, the metallic substrate 302 of FIG. 3 may be non-porous; in other embodiments, the metallic substrate 302 of FIG. 3 may be porous.

The article of manufacture 300 includes metal particles 306 with at least one textured surface. The at least one textured surface is textured by exposure to laser light to increase hydrophobicity of the metal particles 306. In a particular embodiment, the metallic substrate 302 that is coated with the hydrophobic, electrically conductive porous material 304 may have a surface that exhibits a "mesh" of apertures no larger than 5-10 micrometers in size (average diameter), a contact angle greater than 120° (e.g., 150°), and may be permeable to gases and/or non-aqueous solutions but not aqueous solutions.

Figure 4:
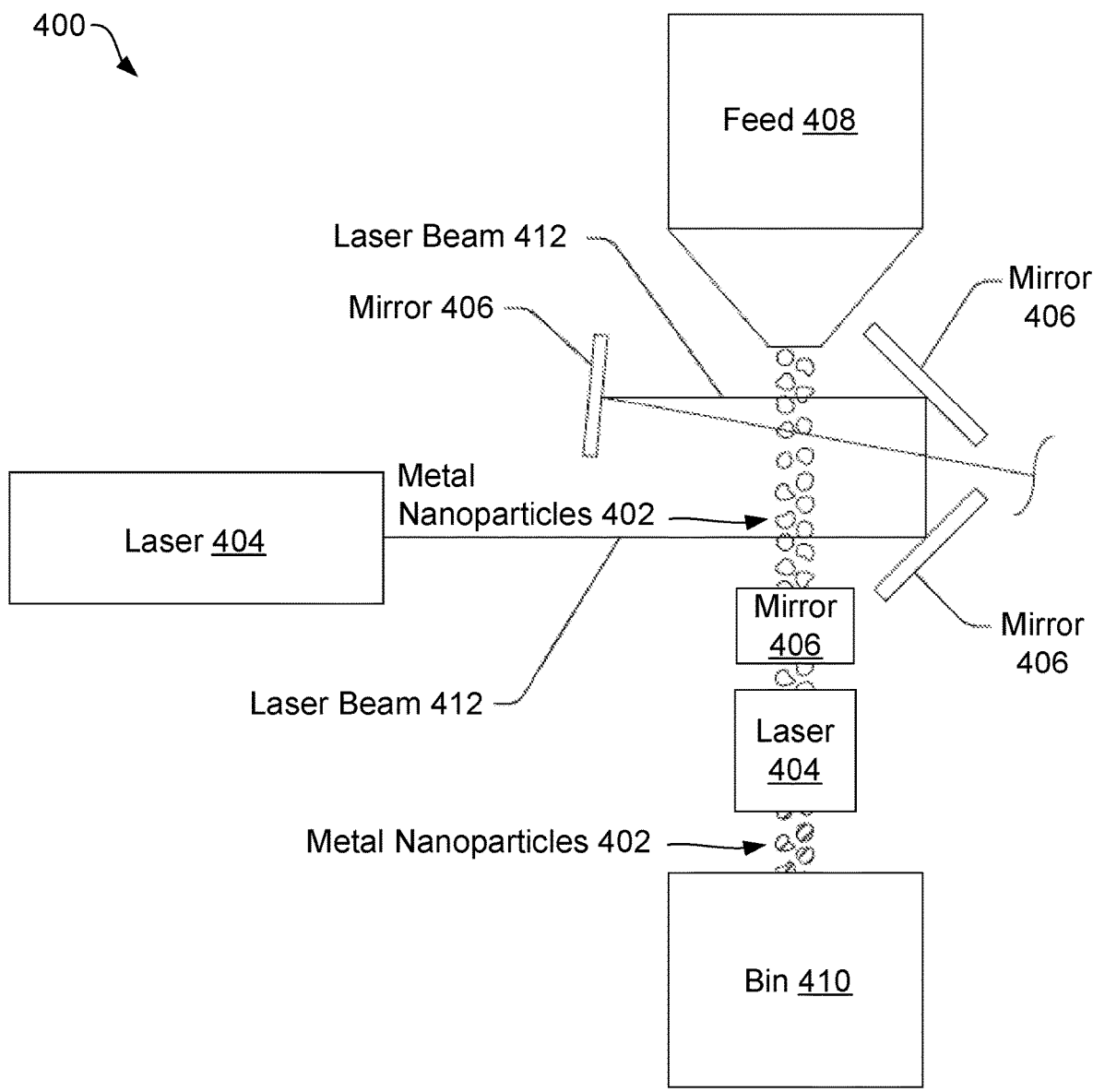
FIG. 4 is a block diagram illustrating a system for implementing a process of treating metal particles before those particles are infused into the plastic lattice of FIG. 1, according to one embodiment.
Figure 5:
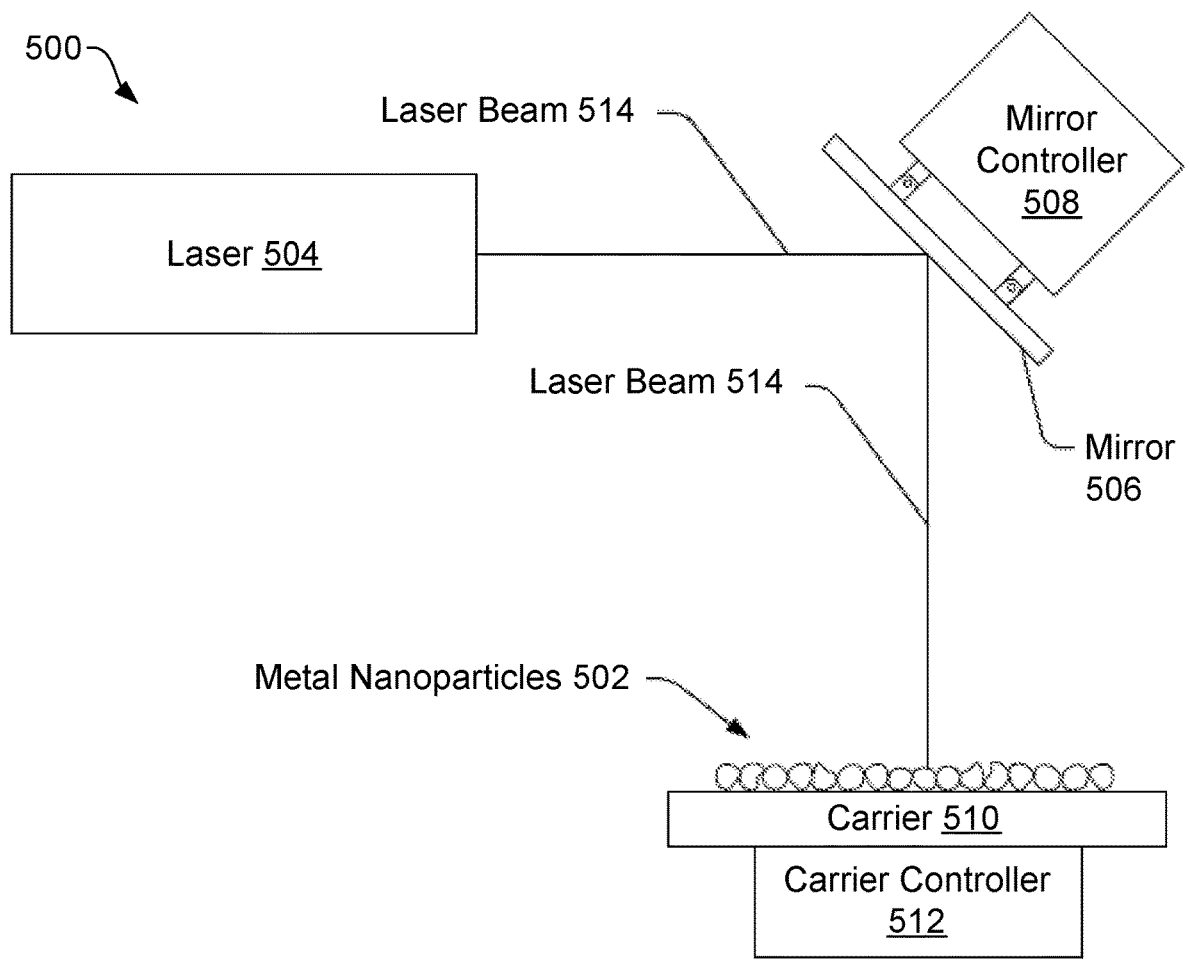
FIG. 5 is a block diagram illustrating a system for implementing a process of treating metal particles before those particles are infused into the plastic lattice of FIG. 1, according to another embodiment.

Two exemplary systems for implementing a process of treating metal particles before the metal-infused plastic lattice is formed, in accordance with the process illustrated in FIG. 1, are disclosed herein with reference to FIGS. 4 and 5. The process of treating metal particles before the metal-infused plastic lattice is formed includes activating one or more lasers to produce laser light. This process also includes exposing metal particles, which are intended to be infused into the plastic lattice, to the laser light to increase hydrophobicity of those metal particles.

Figure 6:
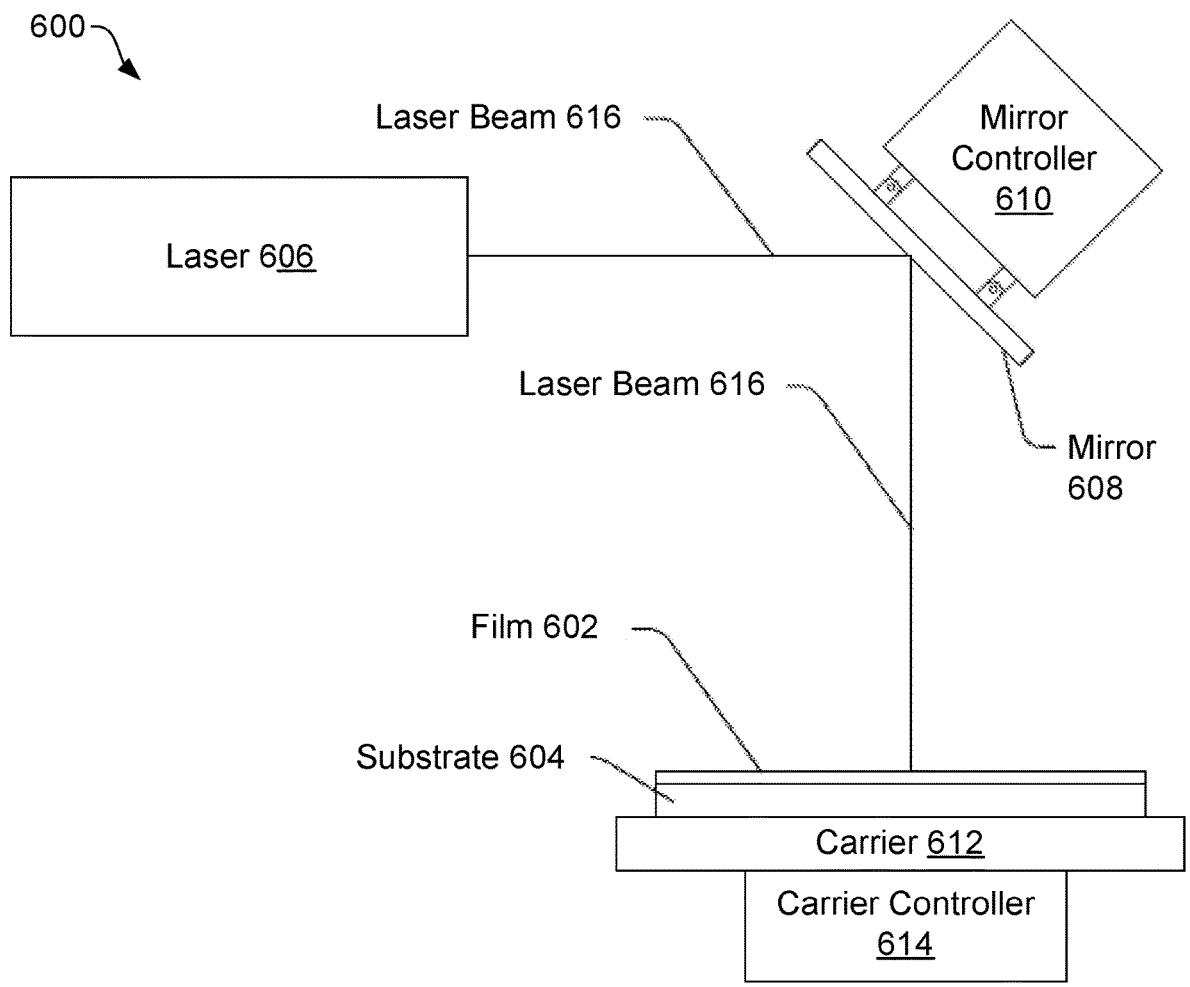
FIG. 6 is a block diagram illustrating a system for implementing a process of treating metal particles after the metal-infused plastic lattice of FIG. 2 is formed, according to one embodiment.

An exemplary system for implementing a process of treating metal particles after the metal-infused plastic lattice is formed, in accordance with the process illustrated in FIG. 2, is disclosed herein with reference to FIG. 6. The process of treating metal particles after the metal-infused plastic lattice is formed includes activating one or more lasers to produce laser light. This process also includes exposing metal particles along a surface of the metal-infused plastic lattice (preferably, after the plastic lattice has been removed from the composite) to the laser light to increase hydrophobicity of the metal particles.

Referring to FIG. 4, a block diagram illustrates a particular embodiment of a system 400 for forming metal particles with a laser-induced hydrophobic characteristic. The system 400 may be used to treat the surface of metal particles before the treated metal particles are infused into the plastic lattice of FIG. 1. In FIG. 4, the system 400 includes metal particles 402, one or more lasers 404, one or more mirrors 406, a feed 408, and a bin 410.

The one or more lasers 404 may be activated to generate one or more laser beams 412. The one or more mirrors may be arranged to reflect the one or more laser beams 412 such that the one or more laser beams 412 have multiple points of intersection with a travel path of the metal particles 402 as the metal particles 402 pass from the feed 408 to the bin 410. A plurality of lasers 404, a plurality of mirrors 406, or both, may enable exposure of the metal particles 402 to laser beams from multiple directions so that a large percentage of a surface area of each of the metal particles 402 is textures to increase hydrophobicity of the metal particles 402.

In FIG. 4, the metal particles 402 are gravity fed from the feed 408 to the bin 410. In another embodiment, the metal particles 402 may be aerosolized and sprayed from the feed 408 to the bin 410, or caused to move across the laser beams 412 via another feed mechanism. For example, the metal nanoparticles 402 may be contained in an aqueous colloidal solution that flows across the laser beams 412. As the metal particles 402 pass from the feed 408 to the bin 410, the metal particles 402 may be exposed to one or more of the laser beams 412 that pass through the travel path of the metal particles 402. The metal particles 402 exposed to the laser beam 412 may be textured by the laser beams to increase hydrophobicity of the metal particles 402. For example, when a laser beam 412 intersects a particular metal particle, a portion of a surface of the particular metal particle may be vaporized or ablated, leaving behind a textured surface. In this example, features formed on the surface of the particular metal particle may be too small to be wetted by water based on a contact angle of water with the metal particle.

In some embodiments, the metal particles 402, or a subset of the metal particles 402, from the bin 410 may be returned to the feed 408 to enable additional exposure of the metal particles 402 to the laser beams 412 for additional texturing. In other embodiments, one pass of the metal particles 402 from the feed 408 to the bin 410 is sufficient to treat the metal particles 402. Metal particles 402 in the bin 410 that are not to be returned to the feed 408 may be infused into the plastic lattice of FIG. 1.

Thus, FIG. 4 illustrates an example of a system 400 to form metal particles 402 with a laser-induced hydrophobic characteristic. The metal particles 402 may be gravity fed, or sprayed through, one or more laser beams 412 to texture surfaces of the metal particles 402 to increase hydrophobicity of the metal particles 402 relative to metal particles 402 not exposed to the one or more laser beams 412.

Referring to FIG. 5, a block diagram illustrates a particular embodiment of a system 500 for forming metal particles with laser-induced hydrophobic characteristics. The system 500 may be used to treat the surface of metal particles before the treated metal particles are infused into the plastic lattice of FIG. 1. In FIG. 5, the system 500 includes metal particles 502, one or more lasers 504, one or more mirrors 506, one or more mirror controllers 508, a carrier 510, and a carrier controller 512.

The metal particles 502 may be placed on the carrier 510. The carrier 510 may be stationary or movable relative to the one or more mirrors 506. For example, the carrier 510 may include or correspond to a conveyor belt, a tray, or another container. In some implementations, the carrier 510 may be movable by the carrier controller 512 so that one or more laser beams 514 generated by the one or more lasers 504 are rastered (i.e., moved) across the metal particles 502 on the carrier 510 to expose the metal particles 502 to the one or more laser beams 514. The carrier controller 512 may also, or as an alternative, be configured to vibrate in order to change the orientation of the metal particles 502 relative to the one or more laser beams 514 so that a large percentage of the surface areas of the metal particles 502 are textured to increase the hydrophobicity of the metal particles relative to metal particles 502 that are not exposed to the one or more laser beams 514.

In an embodiment, the carrier controller 512 may be used to move the carrier 510 in multiple directions, in which case the one or more mirror controllers 508 may be omitted. In other embodiments, the carrier controller 512 may be used to linearly move the carrier 510 (e.g., in a direction into the plane of the page, out of the plane of the page, or both) and the one or more mirror controllers 508 may be used to move the one or more laser beams in other directions (e.g., across a direction of travel of the metal particles 502) so that a large percentage of the metal particles 502 on the carrier 510 are exposed to the one or more laser beams 514.

The one or more mirrors 506 may direct the one or more laser beams 514 to the metal particles 502 on the carrier 510. The one or more mirror controllers 508 may change the positions of the one or more mirrors 506 relative to the metal particles 502 so that the one or more laser beams 514 are rastered across the metal particles 502 on the carrier 510 to expose the metal particles 502 to the one or more laser beams 514.

In an embodiment, a laser beam from a particular laser of the one or more lasers 504 may be directly aimed at the metal particles 502. A movement controller coupled to the particular laser, the carrier controller 512, or both, may be used to raster the laser beam across the metal particles 502. The metal particles 502 on the carrier 510 may be passed through the one or more laser beams 514 one or more times to texture the surfaces of the metal particles 502 to increase hydrophobicity of the particles 502 relative to metal particles 502 not exposed to the one or more laser beams 514. For example, when the laser beam 514 intersects a particular metal particle, a portion of a surface of the particular metal particle may be vaporized or ablated, leaving behind a textured surface with increased hydrophobicity. In this example, features formed on the surface of the particular metal particle may be too small to be wetted by water based on a contact angle of the water with the metal particle. After a last pass of the metal particles 502 through the one or more laser beams 514, the metal particles 502 may be infused into the plastic lattice of FIG. 1.

Thus, FIG. 5 illustrates an example of a system 500 to form metal particles 502 with a laser-induced hydrophobic characteristic. The metal particles 502 may be placed on a carrier 510 and exposed to one or more laser beams 514. The carrier 510 may vibrate the metal particles to change portions of the surfaces of the metal particles 502 exposed to the one or more laser beams, may linearly move the carrier 510 in one or more directions, or both. The one or more laser beams 514 may be rastered across the metal particles 502 (e.g., by movement of the carrier 510, by movement of one or more mirrors 506 by one or more mirror controllers 508, or both) to expose the metal particles 502 to laser light. Exposure of the metal particles 502 to the laser light may texture surfaces of the metal particles 502 to increase hydrophobicity of the metal particles 502 relative to metal particles 502 not exposed to the laser light.

Referring to FIG. 6, a diagram illustrates a particular embodiment of a system 600 for forming metal particles with a laser-induced hydrophobic characteristic. The system 600 may be used to treat the surface of metal particles after the metal particles are infused into the plastic lattice of FIG. 2. In FIG. 6, the system 600 includes a film 602 (that contains metal particles) coupled to a substrate 604, one or more lasers 606, one or more mirrors 608, one or more mirror controllers 610, a carrier 612, and a carrier controller 614. For example, the film 602 and the substrate 604 may respectively correspond to the metal-infused plastic lattice and the porous substrate of FIG. 2. The film 602 may be formed on the substrate 604 (e.g., using a filtering process, wherein an aqueous colloidal solution of metal particles is filtered through a plastic lattice coupled to the substrate 604 until the plastic lattice is saturated with the metal particles), adhered to the substrate 604, attached to the substrate 604 by another process, or combinations thereof.

The combination of the film 602 and the substrate may be placed on the carrier 612. The carrier 612 may be movable by the carrier controller 614 so that one or more laser beams 616 generated by the one or more lasers 606 are rastered across the film 602 to texture the surface of the film 602. In FIG. 6, the one or more laser beams 616 may be used to apply a predetermined pattern to the surface of the film 602. For example, the pattern may be selected to provide desired hydrophobic characteristics at localized sites.

In an embodiment, the carrier controller 614 may be used to move the carrier 612 in one or more directions (e.g., linearly or about an axis). In this embodiment, the one or more mirror controllers 610 may be omitted. In other embodiments, the carrier controller 614 may be used to move the carrier 612 in a first direction, and the one or more mirror controllers 610 may be used to move the one or more laser beams 616 in another direction so that a large percentage of the film 602 is exposed to the one or more laser beams 616. Movement of the carrier 612 and the one or more laser beams 616 may be concurrent or sequential.

The one or more mirrors 608 may direct the one or more laser beams 616 to the film 602 on the carrier 612. The one or more mirror controllers 610 may change positions of the one or more mirrors 608 relative to the film 602 so that the one or more laser beams 616 are rastered across the film 602 on the carrier 612 to expose the film 602 to one or more laser beams 616.

In an embodiment, a laser beam from a particular laser of the one or more lasers 606 may be directly aimed at the film 602. A movement controller coupled to the particular laser, the carrier controller 614, or both, may be used to raster the laser beam across the film 602. The film may be passed through the one or more laser beams 616 one or more times to texture the surface of the film 602 to increase hydrophobicity of the film 602 relative to an identical film that contains metal particles not exposed to the one or more laser beams 616. For example, when a laser beam of the one or more laser beams 616 intersects the film 612, a portion of a surface of the film 602 may be vaporized or ablated, leaving behind a textured surface with increased hydrophobicity. In this example, features formed on the surfaces of the metal particles along a surface of the film 602 may be too small to be wetted by water based on a contact angle of water with the metal particles. After a last pass of the film 602 through the one or more laser beams 616, the film 602 or the combination of the film 602 the substrate 604 may be further processed. For example, the film 602 may be separated from substrate 604 (e.g., the metal-infused plastic lattice may be removed from the porous substrate of FIG. 2 after a last pass of the metal-infused plastic lattice through the one or more laser beams 616).

Thus, FIG. 6 illustrates an example of a system 600 to form a film 602 of metal particles with a laser-induced hydrophobic characteristic. The film 602 may be placed on a carrier 612 and exposed to one or more laser beams 616. The one or more laser beams 616 may be rastered across the film 602 (e.g., by movement of the carrier 612, by movement of one or more mirrors 608 by one or more mirror controllers 610, or both) to expose the film 602 to laser light. Exposure of the film 602 to the laser light may texture surfaces the metal particles along a surface of the film 602 to increase hydrophobicity of the metal particles relative to metal particles not exposed to the laser light.

Figure 7:
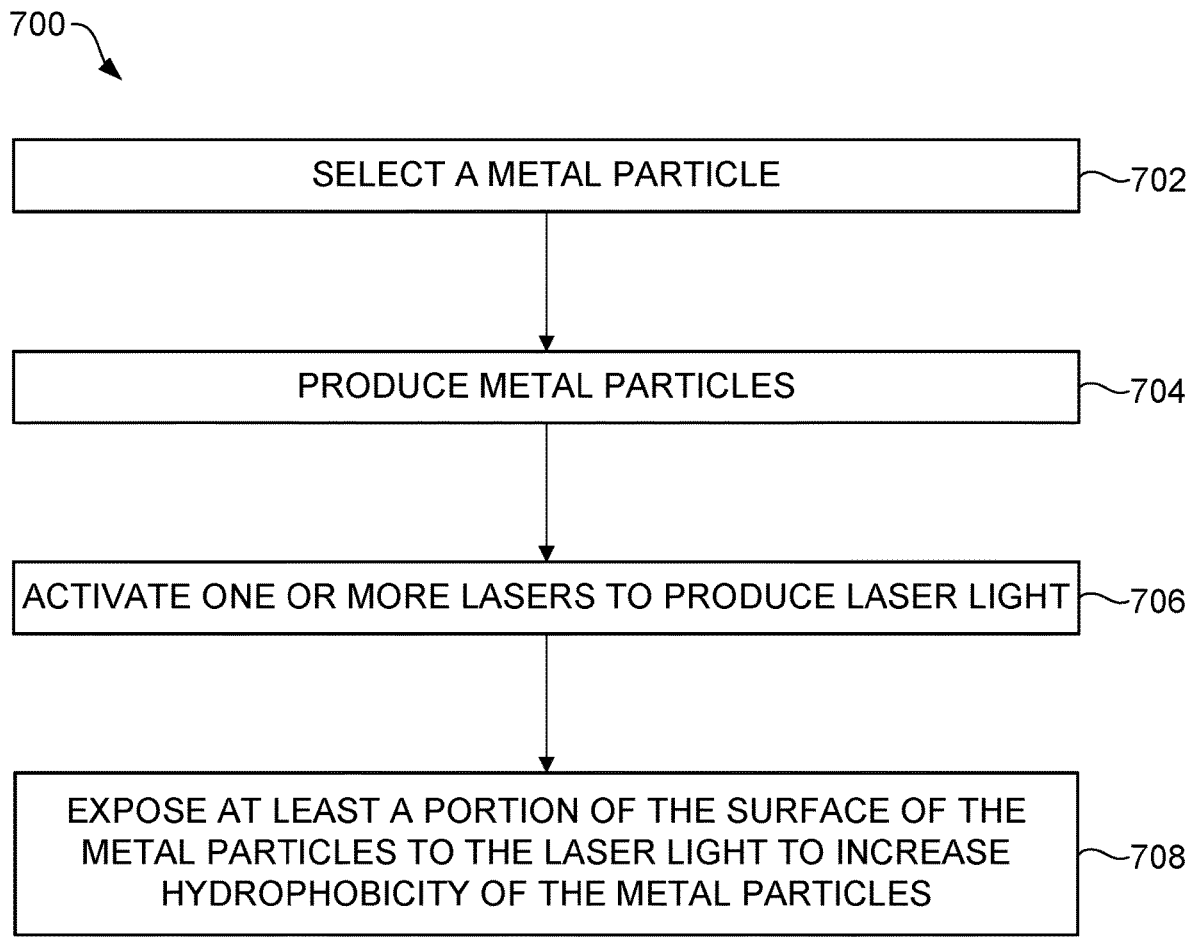
FIG. 7 is a flow diagram showing a particular embodiment of a process of forming metal particles with a laser-induced hydrophobic characteristic of the present disclosure.

Referring to FIG. 7, a flow diagram illustrates an example of a process 700 of forming a metal particle with a laser-induced hydrophobic characteristic of the present disclosure. Process 700 sets forth the preferred order of steps. It must be understood, however, that the various steps (i.e., steps 702-708) may occur simultaneously or at other times relative to one another. Moreover, those skilled in the art will appreciate that one or more steps may be omitted. In particular embodiments, the process 700 may use one of the systems 400, 500 and 600 depicted in FIGS. 4, 5 and 6, respectively.

Process 700 may include selecting a metal particle (step 702). The metal particle may be selected based on one or more desired characteristics. As a particular, non-limiting example, gold nanoparticles may be used. The metal particles may be produced (step 704). Metal particles may be produced using techniques well known to those skilled in the art. Alternatively, the metal particles may be obtained commercially.

One or more lasers may be activated to produce laser light (step 706). The one or more lasers may include one or more femtosecond pulse lasers. In an embodiment, the one or more lasers may produce laser light having about 65 femtosecond (fs) pulses of light at a wavelength of about 800 nanometers (nm), a rate of approximately 1 (kHz), and an energy of about 4 to 10 joules per square centimeter ($J/cm^2$). In other embodiments, laser light with the other characteristics may be used.

At least a portion of the surface of at least a subset of the metal particles may be exposed to the laser light to increase hydrophobicity of the metal particles (step 708). Exposing the metal particles to the laser light may microscopically texture the metal particles to induce steric hydrophobicity.

In a first embodiment, the metal particles may be aerosolized and sprayed, or gravity fed, through the laser light. The metal particles may be passed through the laser light several times to ensure that a large percentage of surface areas of the metal particles are textured by the laser light. Alternatively, the metal particles may be placed on a carrier. The laser light may be rastered across the metal particles on the carrier using a mirror, movement of the lasers, movement of the carrier, or combinations thereof. The carrier may be vibrated to change surface portions of the particles exposed to the laser light and to ensure that a large percentage of surface areas of the metal particles are textured by the laser light.

In a second embodiment, the metal particles may be incorporated in a film coupled to a substrate. The film and the substrate may be placed on a carrier. The laser light may be rastered across the film on the carrier using a mirror, movement of the carrier, movement of the laser, or combinations thereof.

Thus, FIG. 7 illustrates an example of a process of forming metal particles with laser-induced hydrophobic characteristics. The metal particles may be laser treated either as individual entities or after being incorporated in a film coupled to a substrate. The metal particles may be exposed to laser light to texture the metal particles. Texturing the metal particles by exposure to the laser light may increase the hydrophobicity of the metal particles as compared to the same metal particles that are not exposed to the laser light.

Various embodiments disclosed herein describe metal particles with a laser-induced hydrophobic characteristic. Metal particles may be exposed to laser light from a femtosecond pulse layer to induce the hydrophobic characteristic. Exposing the metal particles to the laser light may texture the surface of the metal particles (e.g., by ablation or vaporization). The texturing may increase hydrophobicity of the metal particles as compared to the same metal particles that are not exposed to the laser light.

Those skilled in the art will appreciate that many variations are possible within the scope of the present invention. Thus, while the present invention has been particularly shown and described with reference to some embodiments thereof, it will be understood by those skilled in the art that these and other changes in form and detail may be made therein without departing from the spirit and scope of the present invention.

What is claimed is:

1. A process, comprising:
    providing hydrophobic metal particles;
    forming a composite that includes a plastic lattice infused with the hydrophobic metal particles, wherein the plastic lattice comprises plastic particles that are larger than the hydrophobic metal particles;
    removing the plastic lattice from the composite to form a hydrophobic, electrically conductive porous metallic material;
    wherein providing hydrophobic metal particles includes texturing a surface of metal particles by exposing the metal particles to laser light from a femtosecond pulse laser before forming the composite.

2. The process as recited in claim 1, wherein forming a composite includes:
    filtering a suspension containing the plastic particles through a porous substrate to form the plastic lattice;
    filtering a suspension containing the hydrophobic metal particles through the plastic lattice and the porous substrate to infuse the hydrophobic metal particles into the plastic lattice.

3. The process as recited in claim 2, further comprising:
    removing the composite from the porous substrate.

4. The process as recited in claim 3, further comprising:
    applying the hydrophobic, electrically conductive porous metallic material onto a permanent substrate.

* * * * *